United States Patent Office 3,254,105
Patented May 31, 1966

3,254,105
POLYHALO-CYCLOALKENE ISOCYANATE AND IMIDE CARBONYL CHLORIDE COMPOUNDS
Irving Rosen, Painesville, Ohio, assignor to Diamond Alkali Company, Cleveland, Ohio, a corporation of Delaware
No Drawing. Filed Feb. 26, 1963, Ser. No. 261,202
3 Claims. (Cl. 260—453)

This is a continuation-in-part of my co-pending application Serial No. 784,032, filed December 31, 1958, now U.S. Patent No. 3,080,417.

The present invention relates to novel addition-halogenated cyclic esters, cyclic imido carbonyl halides and cyclic isocyanates, the dehydrohalogenated products of these addition-halogenated compounds, and to novel methods of preparing and using such compounds.

In the past, compounds which contain strong electron-releasing atoms or groups, such as oxygen, phenol, phenol ethers and nitrogen in aniline and aniline derivatives, have not been addition-halogenated due to the ease with which they undergo substitution-halogenation even in the absence of catalysts commonly employed in addition-halogenation. It is, therefore, surprising that combining these electron-releasing atoms or groups with carbonyl-containing groups or their chemical equivalents, as disclosed hereinafter, permits addition-halogenation of such compounds to the practical exclusion of substitution-halogenation.

Addition-halogenated cyclic esters within the scope of the present invention may be represented by the structure:

(I)     $(X)_n$—(cycloalkyl group)—$[O—R^1]_m$ wherein $R^1$ is a radical selected from the group represented by the structures:

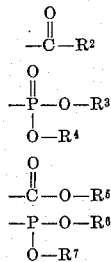

wherein X is halogen, i.e., fluorine, chlorine, bromine or iodine, chlorine being preferred; $R^2$, $R^3$, $R^4$, $R^5$, $R^6$ and $R^7$ are selected from the group consisting of hydrogen atoms, haloalkyl, cycloalkyl, halocycloalkyl, aryl and haloaryl radicals; $n$ is a number greater than 4, e.g., 4 to 11, inclusive; $m$ is an integer from 1 to 6, preferably 1 to 2; any free bonds being satisfied by hydrogen.

The term "cycloalkyl group" as used throughout the specification and claims is intended to refer to cyclic groups, i.e., those groups containing one or more rings, the preferred "cycloalkyl group" being a cyclohexyl group. Another illustrative cycloalkyl group within the scope of this definition is tetrahydrothienyl. The term "cycloalkylene" refers to cyclic groups containing one or more double bonds, e.g., tetrahydronaphthyl, cyclopentenyl and cyclohexenyl.

The term "haloalkyl" as used in the specification and claims is intended to refer to an alkyl radical having at least one halogen atom bonded to one or more carbon atoms of the radical, the preferred haloalkyl radicals being bromo- and chloro-lower-alkyl radicals, that is, halo-alkyl-containing radicals having from 1 to 10 carbon atoms, such as, trichloromethyl, dichloromethyl, monochloromethyl, tribromomethyl, trifluoromethyl, tetrachloroethyl, tetrabromoethyl, tribromoethyl, pentachlorobutyl, diiodomethyl, hexachloropropyl, difluoromethyl and chlorodifluoromethyl. The term "haloaryl" as used in the specification and claims is intended to refer to aryl radicals which have at least one halogen atom substituted on the carbon atoms in the ring, the preferred haloaryl radicals being chlorophenyl and chloronaphthyl radicals; also included within the scope of this definition are bromophenyl, fluorophenyl and iodophenyl. The term "aryl" is also intended to include the aryl radicals previously stated, without halogen-substitution, preferred aryl radicals containing from 1 to 20 carbon atoms, such as phenyl, naphthyl and thienyl radicals, and the like.

Preferred addition-halogenated compounds of this invention within the scope of generic structure I are those having the structure:

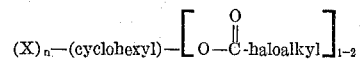

Also included within the scope of the present invention are those compounds represented by the structure:

(II)     $(X)_n$—(cycloalkyl group)—$N$=$C$=$R^8$ wherein $n$, X and "cycloalkyl group" are as previously defined, $R^8$ being selected from the group consisting of oxygen and halogen atoms, preferably chlorine atoms, any free bonds being satisfied by hydrogen.

Compounds within the scope of this invention, e.g., chlorocyclohexyl haloacetate esters, may be hydrolyzed to form chlorophenols, i.e., 2,4,6-trichlorophenol, under mild conditions. Such hydrolysis can be carried out via reaction with dilute acids such as dilute hydrochloric, sulphuric or nitric acid. This sequence of steps may be represented by the following structural reactions:

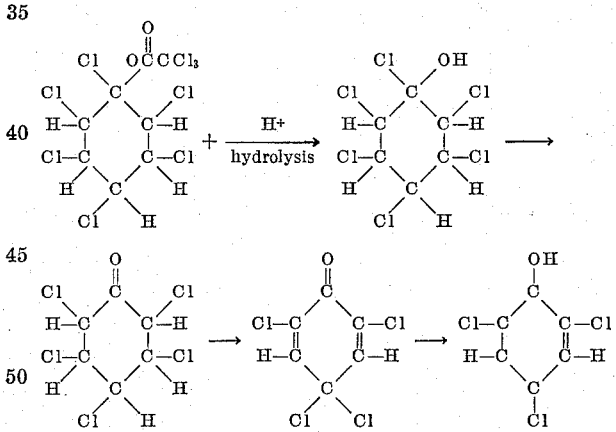

The acid hydrolysis may be effected by stirring a mixture of about 0.033 of a mol. of the addition-chlorinated compound of this invention in 60 ml. of a solvent such as dioxane, ethanol or methylethyl ketone in the presence of 30 ml. of a concentrated acid, e.g., hydrochloric acid, and 60 ml. of water at reflux temperature for about 1 hour. The hydrolysis product may be separated by extraction with an organic solvent such as carbon tetrachloride or chloroform. The pure product may also be isolated through distillation, preferably at reduced pressure.

Compounds within the scope of this invention, i.e., those compounds within the scope of generic structure I above, may be prepared by chemically reacting a compound of structure III:

(III)    $(X)_a$—(cycloalkylene group)—$[O—R^1]_m$ with halogen in such a manner that the halogen adds to the above structure III rather than only substituting, that is, halogen atoms add across a double bond between adjacent carbon atoms in the cycloalkyl group rather than substituting for hydrogens attached to carbon atoms in the ring; wherein X and $R^1$ are as defined under structure I, $a$ being a number from 0 to 5, inclusive, and $m$ is a number from 1 to 6, any free bonds being satisfied by hydrogen.

The term "cycloalkylene group" is intended to refer to a "cycloalkyl group" as previously defined with a degree of unsaturation present within at least one ring, e.g., a cyclohexyl group containing at least one double bond within the ring. Specific examples of "cycloalkylene groups" within this definition are phenyl, naphthyl and cyclopentene radicals.

This addition-chlorination may be carried out at a temperature between −60° C. and +60° C. Typically, however, the compound of structure III is saturated with the halogen at room temperature and then while the halogen is added continuously, the reactant mixture is cooled, generally by contacting the reactor with Dry Ice to obtain a temperature of about −60° C., at which temperature the reactor or pressure tube is sealed and the reactant mixture allowed to warm to room temperature. Upon completion of the reaction, the reactant mixture is cooled and vented. The reaction typically requires between about 2 and 150 hours, e.g., 4 to 48 hours.

The halogen is added to the compound of structure II in an amount sufficient to cause halogen addition; however, it is ordinarily desirable to employ a slight excess over the theoretical amount required, such as about a 5 percent to 30 percent molar excess of the halogen, although as much as 100 percent molar excess may be employed. Normally one mole of a compound within the scope of structure III is mixed with 3 to 12 moles of the halogen. The reaction may be facilitated by the use of a solvent, such as carbon tetrachloride, perchloroethylene or hexachlorobutadiene. Ordinarily, up to about 8 moles of solvent is employed for every mole of compound within the scope of structure III.

The reaction requires the employment of a free radical catalyst, typically actinic radiation or an organic peroxide which will decompose at the desired reaction temperature, such as trichloroacetyl peroxide or benzoyl peroxide. However, the preferred catalyst is actinic radiation in the form of ultraviolet light, otherwise known as black light, or gamma radiation. The rate of reaction increases proportionately with the amount of catalyst or radiation present.

The resulting product may be purified through recrystallization from an organic solvent, recrystallization generally being required for the phosphate and imido carbonyl halide compounds, or through distillation, typically at reduced pressure, the latter procedure ordinarily being required for the organic esters. The esters within the scope of generic structure I typically boil above 50° C. and are insoluble in water but soluble in most common organic solvents, such as acetone, cyclohexanone and xylene.

The preferred preparation of this invention is the addition-halogenation, and specifically, the addition-chlorination, of phenyl esters. This process can be carried out by placing the phenyl ester in a Pyrex glass pressure reactor at room temperature with typically 0 to several ml. of carbon tetrachloride or other non-halogen-reacting solvent. The desired amount of halogen is then added to this mixture. The mixture is then cooled, typically in Dry Ice, to about −50° C. to −60° C., and the reactor sealed. The mixture is then allowed to warm to room temperature, e.g., 20° to 35° C., and is radiated with ultraviolet light over a period of about 2 to 50 hours. The reactor is then cooled and vented, the resulting product being typically isolated through distillation at reduced pressure.

Compounds within the scope of structure II may be prepared by addition-halogenating, preferably addition-chlorinating, a compound represented by the structure:

(IV)    $(X)_p$—(cycloalkylene group)—N=C=$R^8$ wherein $p$ is a number from 0 to 4, inclusive, e.g., 0 to 2, X is halogen, preferably chlorine, $R^8$ is selected from the group consisting of oxygen and halogen atoms, e.g., oxygen and chlorine atoms; any free bonds being satisfied by hydrogen. This addition-halogenation is carried out under essentially the same reaction conditions previously set forth, as in the addition-halogenation of a compound of structure III.

Illustrative reactions within the scope of this invention are given in Table I in which the compounds in column 1 are addition-halogenated with the halogen in column 2, under essentially the same reaction conditions taught previously resulting in the desired addition-halogenation product disclosed in column 3.

TABLE I.—ADDITION-CHLORINATION OF PHENYL ESTERS

| Phenyl Ester Reactant | Halogen | Addition-Halogenated Product |
| --- | --- | --- |
| Phenyl 2,2,3,3-tetrachloropropionate | Chlorine | 1,2,3,4,5,6-hexachlorocyclohexyl-2,2,3,3-tetrachloropropionate. |
| Phenyl 2,2-difluoro-3,3,3-trichloropropionate | do | 1,2,3,4,5,6-hexachlorocyclohexyl-2,2-difluoro-3,3,3-trichloropropionate. |
| Phenyl 2,2,3,3,3-pentafluoropropionate | do | 1,2,3,4,5,6-hexachlorocyclohexyl-2,2,3,3,3-pentafluoropropionate. |
| Phenyl 2,2,3,3-tetrachloropropionate | Bromine | 1,2,3,4,5,6-hexabromocyclohexyl-2,2,3,3-tetrachloropropionate. |
| Phenyl 2,2-difluoro-3,3-dichloropropionate | do | 1,2,3,4,5,6-hexabromocyclohexyl-2,2-difluoro-3,3-dichloropropionate. |
| Phenyl tribromoacetate | do | 1,2,3,4,5,6-hexabromocyclohexyl tribromoacetate. |
| Phenyl 2,3,3-trichloro-2-(trifluoromethyl)propionate | Fluorine | 1,2,3,4,5,6-hexafluorocyclohexyl-2,3,3-trichloro-2-(trifluoromethyl)propionate. |
| p-Chlorophenyl 2,2,3,3-tetrachloropropionate | Bromine | 1,2,3,4,5,6-hexabromo-4-chlorocyclohexyl-2,2,3,3-tetrachloropropionate. |
| p-Fluorophenyl 2,3-difluoro-2,3,3-trichloropropionate | Chlorine | 1,2,3,4,5,6-hexachloro-4-fluorocyclohexyl-2,3-difluoro-2,3,3-trichloropropionate. |
| p-Chlorophenyl 2,2,3,3,3-pentafluoropropionate | Fluorine | 4-chloro-1,2,3,4,5,6-hexafluorocyclohexyl-2,2,3,3,3-pentafluoropropionate. |
| p-Fluorophenyl 2,2,3,3-tetrachloropropionate | Bromine | 1,2,3,4,5,6-hexabromo-4-fluorocyclohexyl-2,2,3,3-tetrachloropropionate. |
| p-Chlorophenyl 3,3-dichloro-2,2-difluoropropionate | Chlorine | 1,2,3,4,4,5,6-heptachlorocyclohexyl-3,3-dichloro-2,2-difluoropropionate. |
| m-Fluorophenyl trifluoroacetate | do | 1,2,3,4,5,6-hexachloro-3-fluorocyclohexyl-trifluoroacetate. |
| m-Chlorophenyl 2,3,3-trichloro-2-(trifluoromethyl)propionate | Bromine | 1,2,3,4,5,6-hexabromo-3-chlorocyclohexyl-2,3,3-trichloro-2-(trifluoromethyl)propionate. |
| p-Fluorophenyl 2,2,3,3,3-pentafluoropropionate | Chlorine | 1,2,3,4,5,6-hexachloro-4-fluorocyclohexyl-2,2,3,3,3-pentafluoropropionate. |
| p-Chlorophenyl benzoate | Fluorine | 4-chloro-1,2,3,4,5,6-hexafluorocyclohexyl-1,2,3,4,5,6-hexafluorocyclohexanecarboxylate. |
| Phenyl p-chlorobenzoate | Chlorine | 1,2,3,4,5,6-hexachlorocyclohexyl-1,2,3,4,4,5,6-heptachlorocyclohexanecarboxylate. |
| Tris(p-chlorophenyl)phosphate | do | Tris(1,2,3,4,4,5,6-heptachlorocyclohexyl)phosphate. |
| Tris(p-fluorophenyl)phosphate | Fluorine | Tris(1,2,3,4,4,5,6-heptafluorocyclohexyl)phosphate. |
| Tris(m-chlorophenyl)phosphate | do | Tris(3-chloro-1,2,3,4,5,6-hexafluorocyclohexyl)phosphate. |
| Bis(m-fluorophenyl)carbonate | Chlorine | Bis(1,2,3,4,5,6-hexachloro-3-fluorocyclohexyl)carbonate. |
| Bis(p-chlorophenyl)carbonate | Bromine | Bis(1,2,3,4,5,6-hexabromo-4-chlorocyclohexyl)carbonate. |
| 2-naphthyl trichloroacetate | Chlorine | 1,2,3,4-tetrachloro-1,2,3,4-tetrahydro-2-naphthyl trichloroacetate. |
| 1-naphthyl trichloroacetate | do | 1,2,3,4-tetrachloro-1,2,3,4-tetrahydro-1-naphthyl trichloroacetate. |

TABLE I.—ADDITION-CHLORINATION OF PHENYL ESTERS—Continued

| Phenyl Ester Reactant | Halogen | Addition-Halogenated Product |
| --- | --- | --- |
| 2-thienyl trichloroacetate | Bromine | 1,2,3,4-tetrabromotetrahydro-2-thienyl trichloroacetate. |
| 3-thienyl trichloroacetate | Chlorine | 1,2,3,4-tetrachlorotetrahydro-3-thienyl trichloroacetate. |
| 6-chloro-2-naphthyl trichloroacetate | do | 1,2,3,4,6-pentachloro-1,2,3,4-tetrahydro-2-naphthyl trichloroacetate. |
| p-Chlorophenyl isocyanate | Fluorine | 4-chloro-1,2,3,4,5,6-hexafluorocyclohexyl isocyanate. |
| Hydroquinone bis(trichloroacetate) | Bromine | 1,2,3,4,5,6-hexabromo-1,4-bis(trichloroacetoxy)cyclohexane. |
| Do | Chlorine | 1,2,3,4,5,6-hexachloro-1,4-bis(trichloroacetoxy)cyclohexane. |
| Catechol bis(trichloroacetate) | do | 1,2,3,4,5,6-hexachloro-1,2-bis(trichloroacetoxy)cyclohexane. |
| Do | Bromine | 1,2,3,4,5,6-hexabromo-1,2-bis(trichloroacetoxy)cyclohexane. |
| Resorcinol bis(trichloroacetate) | Chlorine | 1,2,3,4,5,6-hexachloro-1,3-bis(trichloroacetoxy)cyclohexane. |
| Resorcinol bis(trichloroacetate) | Bromine | 1,2,3,4,5,6-hexabromo-1,3-bis(trichloroacetoxy)cyclohexane. |

While compounds of this invention may be employed in a variety of applications, biological or otherwise, when employed as biologically-active materials, it will be understood, of course, that such compounds may be utilized in diverse formulations, both liquid and solid, including finely-divided powders and granular materials, as well as liquids, such as solutions, concentrates, emulsifiable concentrates, slurries, and the like, depending upon the application intended and the formulation media desired.

These compounds may be used alone or in combination with other known biologically-active materials, such as other pesticides, insecticides, foliage and soil fungicides, pre- and post-emergent herbicides, and the like.

Thus, it will be appreciated that compounds of this invention may be employed to form biologically-active compositions containing such compounds as essential active ingredients thereof, which compositions may also include finely-divided dry or liquid diluents, extenders, fillers, conditioners, including various clays, diatomaceous earth, talc, spent catalyst, alumina-silica materials, liquids, solvents, diluents, or the like, including water and various organic liquids, such as benzene, toluene, chlorinated benzene, acetone, cyclohexanone, xylene, carbon disulfide, carbon tetrachloride, petroleum distillate fractions and various mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X-155 (alkyl aryl polyether alcohol, U.S. Patent No. 2,504,064). Suitable surface active agents are set forth in an article by John W. McCutcheon in "Soap and Chemical Specialties," vol. 31, pages 7–10 (1955).

The term "carrier" as employed in the specification and claims is intended to refer broadly to the materials constituting a major proportion of a biologically-active material or other formulation and hence includes finely-divided materials, both liquids and solids, as aforementioned, conventionally used in such applications.

In order that those skilled in the art may more completely understand the present invention and the preferred method by which the same may be carried into effect, the following specific examples are offered:

EXAMPLE 1

*Preparation of 1,2,3,4,5,6-hexachlorocyclohexyl trichloroacetate*

0.10 mol. (24.0 g.) of phenyl trichloroacetate is placed in a 100 ml. Pyrex pressure tube. The tube is then cooled to about −50° C. employing Dry Ice while continuously adding chlorine. Upon the addition of 0.30 mol. (21.4 g. of chlorine, the tube is sealed, placed in the presence of black light and allowed to warm to room temperature. The reaction mixture is then allowed to stand for a period of about 22 hours in the presence of the actinic radiation, followed by cooling and venting. The resultant crude addition-chlorination product is vacuum distilled and the desired, 1,2,3,4,5,6-hexachlorocyclohexyl trichloroacetate, $C_8H_5Cl_9O_2$, is isolated at 160° to 164° C. employing 0.4 mm. mercury pressure. This pure product is also indicated by the following elemental analytical data:

| Element | Actual Percent By Weight | Calculated Percent By Weight |
| --- | --- | --- |
| C | 21.15 | 21.25 |
| H | 1.16 | 1.11 |
| Cl | 70.6 | 70.5 |

EXAMPLE 2

*Preparation of 1,2,3,4,5,6-hexachlorocyclohexyl trifluoroacetate*

0.26 mol. of phenyl trifluoroacetate is placed in a Pyrex pressure tube and saturated with chlorine. The temperature of the reactant mixture is then lowered to about −50° C. by cooling in Dry Ice with constant chlorine addition. The pressurized tube is then sealed and the reactants are allowed to warm to room temperature while in the presence of black light. The tube and contents are allowed to remain in the presence of the black light at room temperature for a period of about 15 hours after which the reactants are cooled and the tube vented. The crude reaction product is then isolated by distillation, and the fraction boiling at 120° to 123° C. at 1.1 mm. mercury pressure is collected. The resulting 1,2,3,4,5,6-hexachlorocyclohexyl trifluoroacetate, $C_8H_5Cl_6F_3O_2$, having a refractive index of $n_D^{1.4910}$ at 26° C., is indicated by the following elemental analytical data:

| Element | Actual Percent By Weight | Calculated Percent By Weight |
| --- | --- | --- |
| C | 23.23 | 23.82 |
| H | 1.27 | 1.25 |
| Cl | 53.3 | 52.8 |

EXAMPLE 3

*Preparation of 1,2,3,4,5,6-hexachlorocyclohexyl chloroacetate*

0.20 mol. of phenyl chloroacetate and 21.4 ml. of carbon tetrachloride are placed in a Pyrex glass pressure tube. The reactant mixture is then cooled to about −50° C. by immersion in a Dry Ice bath while chlorine is added continuously (0.62 mol. of chlorine is employed). After addition of the chlorine, the tube is sealed and allowed to warm to room temperature in the presence of black light. The reactants are allowed to remain in the presence of black light and at room temperature for a period of about 18 hours at which time they are cooled in Dry Ice again and vented. The resulting product is then distilled, the desired friction boiling at 166° to 172° C. at 1.2 mm. mercury pressure, yielding the desired $C_8H_7Cl_7O_2$, having a refractive index of $n_D^{1.5558}$ at 26° C. and further indicated by the following elemental analytical data:

| Element | Actual Percent By Weight | Calculated Percent By Weight |
|---|---|---|
| C | 25.00 | 25.05 |
| H | 1.92 | 1.84 |
| Cl | 65.6 | 64.9 |

EXAMPLE 4

*Preparation of 1,2,3,4,4,5,6-hexachlorocyclohexyl trichloroacetate*

0.1 mol. of p-chlorophenyl trichloroacetate is reacted with 0.6 mol. of chlorine over a period of 25 to 26 hours in a manner similar to that given in Example 3. The resulting product, $C_8H_4Cl_{10}O_2$, is isolated through distillation, the desired product boiling at 183° to 192° C. at 1 mm. mercury pressure and yielding heptachlorocyclohexyl trichloroacetate having a refractive index of $n_D^{1.5624}$ at 22° C. as indicated by the following elemental analytical data:

| Element | Actual Percent By Weight | Calculated Percent By Weight |
|---|---|---|
| C | 19.62 | 19.73 |
| H | 0.93 | 0.83 |
| Cl | 71.5 | 72.8 |

EXAMPLE 5

*Preparation of 1,2,3,4,5,6-hexachlorocyclohexyl isocyanate*

Phenyl isocyanate is addition-chlorinated in a manner similar to that given in Examples 1, 2, 3, and 4, that is, the addition-chlorination is carried out over a period of 22 hours in a sealed tube in the presence of black light employing carbon tetrachloride as a solvent. The resulting product is purified by filtering the crude reaction product and evaporating off the solvent. The desired isocyanate has a refractive index of $n_D^{1.5712}$ at 24.5° C. This desired $C_7H_5Cl_6ON$ is also indicated by the following elemental analytical data:

| Element | Actual Percent By Weight | Calculated Percent By Weight |
|---|---|---|
| C | 25.20 | 25.30 |
| H | 1.41 | 1.51 |
| Cl | 63.0 | 64.0 |

EXAMPLE 6

*Preparation of bis(1,2,3,4,5,6-hexachlorocyclohexyl) carbonate*

Diphenyl carbonate is addition-chlorinated in a manner similar to that given in previous Examples 1, 2, 3, 4, and 5 by employing a sealed tube and black light radiation; 6 moles of chlorine is mixed with 1 mole of diphenyl carbonate in the presence of carbon tetrachloride as solvent over a period of 17 hours. The resulting desired product is isolated by precipitation from a methanol-water mixture and dried, resulting in a product melting at 84° to 90° C. This desired bis(hexachlorocyclohexyl)carbonate,

is further indicated by the following elemental analytical data:

| Element | Actual Percent By Weight | Calculated Percent By Weight |
|---|---|---|
| C | 25.3 | 24.4 |
| H | 1.7 | 1.58 |
| Cl | 63.4 | 66.5 |

A minor amount of bis(polychlorophenyl)carbonate results as a by-product of this addition-chlorination. Typically, the phenyl groups contain from 1 to 4 substituted chlorine atoms.

EXAMPLE 7

*Preparation of tris(1,2,3,4,5,6-hexachlorocyclohexyl) phosphate*

Triphenyl phosphate is addition-chlorinated in a manner similar to that given in Examples 1, 2, 3, 4, 5 and 6 by chemically reacting triphenyl phosphate with a saturated solution of chlorine in a sealed tube in the presence of black light radiation and carbon tetrachloride as a solvent over a period of 16 hours. The resulting product is purified by recrystallization from cyclohexane yielding the desired, $C_{18}H_{15}Cl_{18}PO_4$, which decomposes at 120° C. and is further indicated by the following elemental analytical data:

| Element | Actual Percent By Weight | Calculated Percent By Weight |
|---|---|---|
| C | 26.2 | 22.4 |
| H | 2.2 | 1.56 |
| Cl | 60.2 | 66.2 |

EXAMPLE 8

*Preparation of N-(1,2,3,4,5,6-hexachlorocyclohexyl) imidocarbonyl chloride*

0.137 mol. of N-phenyl imidocarbonyl chloride is addition-chlorinated with 0.47 mol. of chlorine in the presence of 20 ml. of carbon tetrachloride and black light radiation in a sealed tube over a period of 16 hours. The resulting product is recrystallized from carbon tetrachloride and N-hexane yielding a product melting at 129° to 139° C. and indicated by the following elemental analytical data:

| Element | Actual Percent By Weight | Calculated Percent By Weight |
|---|---|---|
| C | 22.1 | 21.75 |
| H | 1.3 | 1.3 |
| Cl | 73.5 | 73.4 |

EXAMPLE 9

*Preparation of 1,2,3,4,5,6-hexachlorocyclohexyl trichloroacetate*

The preparation according to Example 1 is repeated with the exception that in place of the black light (ultraviolet radiation) as a catalyst, the chlorination is carried in the presence of gamma radiation. Similar yields and products as those obtained in Example 1 result, indicating that the black light radiation and gamma radiation are essentially equivalent for the purposes of this invention.

EXAMPLE 10

*Hydrolysis of 1,2,3,4,5,6-hexachlorocyclohexyl trichloroacetate*

15.0 g. (0.032 mol.) of 1,2,3,4,5,6-hexachlorocyclohexyl trichloroacetate is dissolved in 50 ml. of dioxane. To this 30 ml. of concentrated HCl dissolved in 60 ml. of water are added and the reactant mixture is refluxed for 1 hour. Upon reaction completion, the product is separated by extraction with chloroform, after which the chloroform is evaporated and the desired residue distilled at a temperature of 120° to 124° C. at 39 mm. mercury pressure yielding the desired 2,4,6-trichlorophenol.

EXAMPLE 11

*Hydrolysis of 1,2,3,4,5,6-hexachlorocyclohexyl trifluoroacetate*

In a procedure similar to that given in Example 10, 1,2,3,4,5,6 - hexachlorocyclohexyl trifluoroacetate is hydrolyzed by adding 0.08 mol. of the above cyclohexyl trifluoroacetate to a dioxane-water mixture at 10° to 25° C. The resulting product is extracted with chloroform and upon distillation, 2,4,6-trichlorophenol results.

EXAMPLE 12

*Preparation of p-hydroquinone bis(trichloroacetate)*

In a 1 liter flask are placed 100 g. (0.91 moles) of hydroquinone and 400 ml. of pyridine. To the stirred solution is added 364 g. (2.0 moles) of trichloroacetyl chloride at a fast dropwise rate. The exothermic reaction is moderated by keeping the temperature of the mixture at about 50° C. by cooling with an ice bath. When about one-half of the acid chloride has been added, solids begin to form and stirring becomes more difficult. The temperature is allowed to rise to about 75° C. and is maintained there until the addition is complete. Stirring is continued for one-half hour and the mixture is filtered at room temperature using a vacuum. The solid is washed with water and filtered. After air drying, there is obtained 142 g. (39% yield) of crude amber-tinted solid. Recrystallization from ether-benzene mixture or n-hexane gives 55 g. (15% yield) of pure material melting at a temperature of 139° to 140° C.

EXAMPLE 13

*Preparation of catechol bis(trichloroacetate)*

In a 2-liter flask are stirred 110 g. (1.0 mole) of catechol, 158 g. (2.0 moles) of pyridine and 500 ml. of benzene. To this solution at room temperature, 364 g. (2 moles) of trichloroacetyl chloride is added dropwise over a period of one hour. The exothermic reaction is moderated by using an ice bath as necessary, but the temperature is allowed to gradually increase to a maximum of about 73° C. as solids appear and the mixture thickens. The solids are collected with suction and treated with ether to dissolve the product. The filtrate is diluted with water and ether extracted. The combined ether extracts are water washed, dried and solvent stripped to give 392 g. (98% yield) of crude liquid product. Vacuum distillation under $N_2$ gives 289 g. (72% yield) of purified $C_{10}H_4Cl_6O_4$ having a boiling point of 143° to 148° C. at 0.5 to 0.7 mm. Hg pressure. The structure is confirmed by infrared spectral analysis and the following elemental analysis:

| Element | Actual Percent By Weight | Calculated Percent By Weight |
|---|---|---|
| C | 30.8 | 30.8 |
| H | 1.1 | 1.0 |
| Cl | 53.0 | 53.1 |

EXAMPLE 14

*Preparation of 1,2,3,4,5,6-hexachloro-1,2-bis(trichloroacetoxy)cyclohexane*

In a Pyrex pressure tube, cooled in Dry Ice, are placed 40 g. (0.1 mole) of catechol bis(trichloroacetate), 25 ml. of $CCl_4$ and 25 g. (0.353 mole) of liquid chlorine. The tube is sealed and irradiated with ultraviolet light for 24 hours during which time the temperature of the tube rises to about room temperature. The tube is then vented and the product is solvent stripped to yield 52 g. (85%) of viscous liquid. Vaccum distillation under $N_2$ gives 19 g. (31% yield) of very viscous liquid having a boiling point of 170° C. at 0.09 mm. Hg pressure. Infrared spectrum verifies the disappearance of aromatic double bonds and supported the assigned structure for $C_{10}H_4Cl_{12}O_4$. The elemental analysis is:

| Element | Actual Percent By Weight | Calculated Percent By Weight |
|---|---|---|
| C | 20.5 | 19.6 |
| H | 0.9 | 0.7 |
| Cl | 67.6 | 69.3 |

EXAMPLE 15

*Preparation of resorcinol bis(trichloroacetate)*

The procedure of Example 13 is followed substituting 110 g. (1.0 mole) of resorcinol for catechol. The reaction proceeds in a similar manner reaching a maximum temperature of about 67° C. The solid is collected and washed with fresh benzene. The benzene extracts, after concentrating and cooling, give 142 g. (36% yield) of glistening plates having a melting point of 79° to 80° C. Infrared and elemental analyses confirm the structure for resorcinol bis(trichloroacetate).

EXAMPLE 16

*Preparation of 1,2,3,4,5,6-hexachloro-1,3-bis(trichloroacetoxy)cyclohexane*

Following the procedure of Example 14, 20 g. (0.05 mole) of freshly recrystallized resorcinol bis(trichloroacetate), 30 ml. of $CCl_4$ and 21.3 g. (0.3 mole) of liquid chlorine are combined and irradiated for 24 hours. The tube is vented and the solvent and excess $Cl_2$ are removed in vacuo. Heating at 140° C. under 0.07 mm. Hg pressure for 2 hours causes some sublimation and removal of low boiling material and there remains 27.5 g. (90% yield) of thick, amber residue. The structure for $C_{10}H_4Cl_{12}O_4$ is confirmed by infrared spectrum and the following elemental analysis:

| Element | Actual Percent By Weight | Calculated Percent By Weight |
|---|---|---|
| C | 20.5 | 19.6 |
| H | 0.6 | 0.7 |
| Cl | 66.5 | 69.3 |

EXAMPLE 17

*Black bean aphid systemic test*

This test determines the insecticidal activity of the compound being tested against the bean aphid *Aphis rumicis*.

The bean aphid is cultured on nasturtium plants, var. Tall Single. No attempt is made to select insects of a given age in these tests.

One day, but no more than two, after transferring aphids to a new flat of nasturtiums, about 2-inches tall, grown in 2½-inch clay pots (with drainage holes plugged with absorbent cotton to prevent possible run-through of test formulation after drenching onto the soil), the plants are trimmed so that each pot contains one to five stems with an approximate total of 100 aphids per pot. A dosage of 11.2 ml. of the 2000 p.p.m. test formulation, or 22.4 mg. per 2.5-inch pot which is equivalent to 64 pounds per acre, is poured on the soil after infestation. This test formulation contains 0.4 g. of the test compound, 8 ml. acetone, 4 ml. stock emulsifier solution (0.5% Triton X-155 in water by volume) and 187.6 ml. distilled water. Lower concentrations of toxicant in this formulation are obtained by diluting the formulation with distilled water. The pots are placed in an inclined position in Dixie cups over paper marked with a grid. Most dead aphids fall to the paper. Percentage mortality is determined three days after treatment. Since this is a three-day test, it is necessary to add water to the Dixie cup to prevent wilting of the plants. Results of insecticidal activity are given in the following table.

Compound tested: Percent mortality
1,2,3,4,5,6-hexachlorocyclohexyl trichloroacetate _____ 86
1,2,3,4,5,6-hexachlorocyclohexyl chloroacetate __ 50

EXAMPLE 18

Bean beetle leaf dip test

This test determines the insecticidal activity of the compound being tested against the Mexican bean beetle *Epilachna varivestis*.

The test species is composed of fourth instar larvae, less than one day old within the instar. Paired fully expanded seed leaves excised from Tendergreen bean plants are dipped into the test formulation and agitated until they are thoroughly wetted. The test formulation contains 0.4 g. of test compound, 8 ml. of acetone, 4 ml. stock emulsifier solution (0.5% Triton X-155 in water by volume) and 187.6 ml. distilled water. The concentration of toxicant in this formulation is 2000 p.p.m. Lower concentrations of toxicant are obtained by diluting the formulation with distilled water. The chemical deposited on the leaves is then dried and the paired leaves are separated. One leaf is placed into each of two Dixie cups (5 oz.) and 10 randomly selected larvae are counted into each Dixie cup which is then covered with a 9 cm. Petri dish cover. These are held at 70° F. for three days, after which mortality and feeding inhibition are determined. The feeding inhibition is an indication of the repellent properties of the test chemical. Results of insecticidal activity are given in the following table.

| Compound Tested | Parts per Million | Percent Mortality |
|---|---|---|
| 1,2,3,4,5,6-hexachlorocyclohexyl isocyanate | 2,000 | 100 |
|  | 1,000 | 20 |

EXAMPLE 19

Roach immersion test

This test determines the insecticidal activity of the compound being tested against the German cockroach, *Blattella germanica*.

Twenty adult males, 7 to 9 weeks old, are anesthetized with carbon dioxide and counted into a 150 ml. beaker. Seventy-five ml. of test formulation is poured into the beaker containing the roaches. The test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 p.p.m. Lower concentrations of toxicant are obtained by diluting the formulation with distilled water. The contents of the roach beaker are immediately poured back into the formulation beaker. This sloshing is repeated three more times and the roaches are immediately screened on a copper screen wire and drained a few seconds on towel paper. Ten of the treated roaches are counted into each of two Dixie cups (3¼" diameter x 1¼" deep) which are then capped with Petri dish covers. Mortality counts are made three days after treatment. Results of insecticidal activity are given in the following table.

| Compound Tested | Parts per Million | Percent Mortality |
|---|---|---|
| 1,2,3,4,5,6-hexachlorocyclohexyl isocyanate | 2,000 | 90 |
| 1,2,3,4,5,6-hexachloro-1,2-bis(trichloroacetoxy)-cyclohexane | 1,000 | 80 |

EXAMPLE 20

Spore inhibition test on glass slides

Inhibition of spore germination on glass slides by the test tube dilution method is adopted from the procedure recommended by the American Phytopathological Society's Committee on Standardization of Fungicidal Tests. In this screen, chemicals at 1000, 100, 10 and 1.0 p.p.m. are tested for ability to inhibit germination of spores from 7- to 10-day-old cultures of *Alternaria oleracea* Mil. and *Monilina fructicola* (Wint.) Honey. These concentrations refer to the actual concentrations after diluting the test preparations with spore stimulant and spore suspension. A formulation containing 0.1 g. of the test compound, 4 ml. acetone, 2 ml. stock emulsifier solution (0.5% Triton X-155 in water by volume) and 74 ml. distilled water is used for this test. The concentration of toxicant in this formulation is 1250 p.p.m. The concentrations given above are diluted from this original formulation. Germination records are taken after 20 hours of incubation at 22° C. by observing several microscope fields so that at least 100 spores of each fungus have been examined at each concentration. Copper sulfate is used as a standard reference material. Test compounds are given alphabetical ratings which correspond to the concentration that inhibits germination of half the spores (ED50) in the test drops: AAA=0.01 to 0.1 p.p.m.; AA=0.1 to 1.0 p.p.m.; A=1.0 to 10 p.p.m.; B=10 to 100 p.p.m.; C=100 to 1000 p.p.m.; and D=1000 p.p.m. Using this procedure, the following results were obtained:

Compound tested: Rating
1,2,3,4,5,6 - hexachlorocyclohexyl trichloroacetate _____ AA
1,2,3,4,5,6 - hexachlorocyclohexyl trifluoroacetate _____ AA
1,2,3,4,4,5,6-heptachlorocyclohexyl trichloroacetate _____ AA
1,2,3,4,5,6-hexachlorocyclohexyl isocyanate_____ AA
bis(1,2,3,4,5,6-hexachlorohexyl) carbonate ___ B
N-(1,2,3,4,5,6 - hexachlorocyclohexyl) imidocarbonyl chloride _____ AA

EXAMPLE 21

Foliage protectant and eradicant tests

The tomato foliage disease test measures the ability of the test compound to protect tomato foliage against infection by the early blight fungus *Alternaria solani* (Ell. and Mart.). The method used is a modification of that described by McCallan and Wellman and employs tomato plants (var. Bonny Best) 5 to 7 inches high which are 4 to 6 weeks old. Duplicate plants, one set for each test fungus, are sprayed with various dosages of the test formulation at 40 pounds per square inch pressure while being rotated on a turntable in a hood. The center of the turntable is 45 inches from the nozzle of the spray gun. The test formulation containing 0.4 g. of test compound, 8 ml. acetone, 4 ml. stock emulsifier solution (0.5% Triton X-155 in water by volume) and 187.6 ml. distilled water is applied at dosages equivalent to 2000 and 400 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation without toxicant) are sprayed while being rotated on a turntable with a spore suspension containing approximately 20,000 conidia of *A. solani* per ml. The atomizer used delivers 20 ml. in the 30-second exposure period. The plants are held in a saturated atmosphere for 24 hours at 70° F. (for E. Blight) to permit spore germination and infection before removal to the greenhouse. After two days from the start of the test for early blight lesion counts are made on the three uppermost fully expanded leaves. The data are converted to percentage disease control based on the number of lesions obtained on the control plants. Dosages and percent disease control are given in the following table.

| Compound | Dosage, p.p.m. | Percent Disease Control |
|---|---|---|
| 1,2,3,4,5,6-hexachlorocyclohexyl trifluoroacetate | 400 | 61 |
| 1,2,3,4,5,6-hexachlorocyclohexyl chloroacetate | 400 | 71 |
| 1,2,3,4,5,6-heptachlorocyclohexyl trichloroacetate | 400 | 52 |
| 1,2,3,4,5,6-hexachlorocyclohexyl isocyanate | 400 | 91 |
| Bis(1,2,3,4,5,6-hexachlorocyclohexyl) carbonate | 400 | 72 |
| N(1,2,3,4,5,6-hexachlorocyclohexyl) imidocarbonyl chloride | 400 | 100 |
| | 64 | 100 |
| | 32 | 83 |
| | 16 | 37 |

EXAMPLE 22

Early blight systemic

This test measures the systemic fungicidal action of compounds of this invention against the early blight fungus *Alternaria solani*. Tomato plants, two to three weeks old, growing in four-inch clay pots, are employed. In the test, an appropriate dosage of test formulation is applied to the soil. A dosage of 56 ml. is equivalent to a concentration of active chemical of 112 mg., or 128 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 p.p.m. Lower concentrations of toxicant are obtained by employing less toxicant and more water, thereby maintaining the same concentration of acetone and emulsifier.

One week after the drench treatment, treated plants and controls (treated with formulation without toxicant) are sprayed while being rotated on a turntable with a spore suspension containing approximately 20,000 conidia of *A. solani* per ml. The atomizer used delivers 20 ml. in the 30-second exposure period. The plants are held in a saturated atmosphere for 24 hours at 70° F. to permit spore germination and infection before removal to the greenhouse. After 48 hours lesion counts are made and converted to percentage disease control based on check plants. Using this procedure, the following results are obtained:

| Compound | Dosage, lbs./acre | Percent Disease Control |
|---|---|---|
| 1,2,3,4,5,6-hexachlorocyclohexyl trifluoroacetate | 128 | 50 |
| 1,2,3,4,5,6-hexachlorocyclohexyl chloroacetate | 128 | 61 |

EXAMPLE 23

Seed decay and damping-off pea test

This test is used to determine activity against seed decay and damping-off fungi, primarily Pythium and Rhizoctonia species.

Sterilized soil is infested with Pythium and Rhizoctonia and subsamples placed into a series of 4-oz. Dixie cups. An appropriate amount of the test formulation is drenched onto the soil at a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 p.p.m. Lower concentrations of toxicant are obtained by diluting the formulation with distilled water. The surface area of the soil in the cups is 5.73 square inches; therefore, a rate of 1 pound per acre requires 0.414 mg. of chemical per cup. After drenching, the Dixie cups are then incubated for several days at 70° F. in a controlled temperature cabinet. The test chemicals are rated for their ability to inhibit mycelial growth of the organism on the surface of the soil. Untreated checks and a standard material are included in each test in addition to a check planted in sterilized soil. Using this procedure, the following results are obtained:

| Compound | Concentration, lbs./acre | Percent Control |
|---|---|---|
| 1,2,3,4,5,6-hexachloro-1,2-bis(trichloroacetoxy)cyclohexane | 64 | 100 |
| 1,2,3,4,5,6-hexachloro-1,3-bis(trichloroacetoxy)cyclohexane | 64 | 100 |

EXAMPLE 24

Soil mycelial growth inhibition test

The following test measures the ability of compounds of this invention to inhibit mycelial growth in soil. Sterilized soil is infested with *Rhizoctonia solani* (grown on a corn meal sand medium) by mixing two 250-ml. flasks of a ten-day-old culture of the organism per level flat of sterile soil. The infested soil is then placed in small Dixie cups (4 oz. squat). Treatment of the soil is accomplished by drenching the appropriate amount of a diluted formulation containing 0.4 g. of test compound, 8 ml. acetone, 4 ml. stock emulsifier solution (0.5% Triton X-155 in water by volume) and 187.6 ml. distilled water on the surface of the soil in the test cup. The concentration of toxicant in this formulation is 2000 p.p.m. Lower concentrations of toxicant are obtained by diluting the formulation with distilled water. Surface area of the soil in the cups is 5.73 square inches; therefore, a rate of one pound per acre requires 0.414 mg. of chemical per cup. After drenching, the cups are placed in a saturated atmosphere at 70° F. for 48 hours. By this time the fungus mycelium has completely overgrown the surface of the soil in the control cups. Inhibition of mycelial growth in the treated cups is estimated on a scale from zero, complete inhibition of growth, to ten which is equivalent to controls. These grades are expressed as percent control. Using this procedure, the following results are obtained:

| Compound | Concentration, lbs./acre | Percent Control |
|---|---|---|
| 1,2,3,4,5,6-hexachloro-1,2-bis(trichloroacetoxy)cyclohexane | 64 | 50 |
| 1,2,3,4,5,6-hexachloro-1,3-bis(trichloroacetoxy)cyclohexane | 64 | 60 |

EXAMPLE 25

Inhibition of sclerotial germination

This test is used to measure the ability of compounds of this invention to inhibit the germination of sclerotia of *Sclerotium rolfsii*.

Sterilized soil is infested with *Sclerotium rolfsii* and subsamples placed into a series of 4-oz. Dixie cups. An appropriate amount of the test formulation is drenched onto the soil at a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 p.p.m. Lower concentrations of toxicant are obtained by diluting the formulation with distilled water. The surface area of the soil in the cups is 5.73 square inches; therefore, a rate of 1 pound per acre requires 0.414 mg. of chemical per cup. After drenching, the Dixie cups are then incubated for several days at 70° F. in a controlled temperature cabinet. The test chemicals are rated for their ability to inhibit mycelial growth of the organism on the surface of the soil. Untreated checks and a standard material are included in each test in addition to a check planted in sterilized soil. Using this procedure, the following results are obtained:

| Compound | Concentration, lbs./acre | Percent Control |
|---|---|---|
| 1,2,3,4,5,6-hexachloro-1,3-bis(trichloroacetoxy)cyclohexane | 64 | 70 |

EXAMPLE 26

Tests against four species

Test formulations are examined for ability to inhibit the growth of four bacterial species *Erwinia amylovora*, (E.a.), *Xanthomonas phaseoli* (X.p.), *Micrococcus pyrogenes* var. *aureus* (M.a.) and *Escherechia coli* (E.c.) at various concentrations. The basic test formulation contains 0.1 g. of the test chemical, 4 ml. acetone, 2 ml. stock emulsifier solution (0.5% Triton X–155 in water by volume) and 74 ml. distilled water, the concentration of toxicant in this formulation being 1250 p.p.m. Lower concentrations of toxicant are obtained by diluting the basic formation with distilled water. All of the bacterial species are cultured on nutrient agar slants except *X. phaseoli* which is grown on potato dextrose agar.

The cultures used for testing are subcultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbidimetric measurement. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard 4 mm. platinum loop to 7 ml. of sterile broth. The broth tubes are then incubated for 48 hours at 29° to 31° C., at which time bacterial growth is determined by turbidimetric measurement. A reading is recorded for each test tube after shaking. Three replicates of each organism serve as controls. Comparative growth calculations are made on the percent of the mean check reading. This value, subtracted from 100, gives percent control as compared to checks. Using this procedure, the following results are obtained:

| Compound | Concentration, p.p.m. | Percent Control ||||
|---|---|---|---|---|---|
| | | E.a. | X.p. | M.a. | E.c. |
| 1,2,3,4,5,6-hexachlorocyclohexyl trichloroacetate | 1,000 | 100 | 100 | 100 | 100 |
| 1,2,3,4,5,6-hexachlorocyclohexyl trifluoroacetate | 1,000 | 100 | 97 | 100 | 100 |
| | 16 | 100 | 100 | 100 | 100 |
| | 8 | 100 | 100 | 55 | 80 |
| | 4 | 72 | 70 | 70 | 62 |
| 1,2,3,4,5,6-hexachlorocyclohexyl chloroacetate | 1,000 | 100 | 100 | 100 | 100 |
| | 16 | 100 | 100 | 63 | 100 |
| | 8 | 85 | 83 | 84 | 61 |
| 1,2,3,4,5,6-heptachlorocyclohexyl trichloroacetate | 500 | 100 | 100 | 100 | 100 |
| | 16 | 100 | 57 | 100 | 84 |
| | 8 | 100 | 100 | 100 | 100 |
| | 4 | 72 | 67 | 74 | 72 |
| 1,2,3,4,5,6-hexachlorocyclohexyl isocyanate | 250 | 100 | 100 | 100 | 100 |
| | 64 | 72 | 100 | 100 | 63 |
| | 32 | 75 | 80 | 63 | 63 |
| Catechol bis(trichloroacetate) | 250 | 100 | 100 | 100 | 100 |
| | 100 | 100 | 100 | 100 | 0 |
| 1,2,3,4,5,6-hexachloro-1,2-bis-(trichloroacetoxy)cyclohexane | 250 | 100 | 100 | 100 | 100 |
| 1,2,3,4,5,6-hexachloro-1,3-bis-(trichloroacetoxy)cyclohexane | 250 | 100 | 100 | 100 | 100 |
| N(1,2,3,4,5,6-hexachlorocyclohexyl)imidocarbonyl chloride | 250 | 27 | 100 | 100 | 37 |
| Bis(1,2,3,4,5,6-hexachlorocyclohexyl)carbonate | 250 | 9 | 0 | 21 | 66 |
| Tris(1,2,3,4,5,6-hexachlorocyclohexyl)phosphate | 250 | 19 | 6 | 16 | 14 |

EXAMPLE 27

Post emergence pan test

This test measures the post-emergent herbicidal activity of test chemicals when applied to the foliage of seedling plants as well as to the soil in which they are growing. Two mixtures of seed are planted in soil contained in metal half flats, which are 8" x 12" at the soil surface. One-half of each pan is planted with a mixture containing the broadleaf species, buckwheat, aster and turnip. The other half of the pan is seeded to a mixture of three grasses, millet, perennial ryegrass, and sorghum. One-half level teaspoon of each seed mixture is planted in each pan. The flats are then removed to the greenhouse and the test species are allowed to grow until one true leaf is present on the slowest growing broadleaf (aster), which requires 9 to 14 days. At this point the surface of the soil in the pans is uniformly covered by spraying, at 10 pounds per square inch air pressure, with 40 ml. of a test formulation containing the toxicant. Formulations containing 165.6 mg. and 82.8 mg. of the test chemical are equivalent to a coverage of 24 and 12 pounds per acre, respectively. Each test formulation contains the toxicant, equal volumes of water and acetone, and 2 drops of Triton X–155.

Two weeks after treatment estimates are made on the fresh weight of seedling stand in the test pans, as well as that in untreated control pans. The percent control obtained with the test chemical is calculated. Using this procedure, the following results are obtained:

| Compound Tested | Concentration, pounds/acre | Percent Control ||
|---|---|---|---|
| | | Broadleaf weeds | Grassy weeds |
| Catechol bis(trichloroacetate) | 24 | 75 | 99. |
| | 12 | 10 | 50. |
| 1,2,3,4,5,6-hexachloro-1,2-bis-(trichloroacetoxy)cyclohexane. | 24 | 80 | 95. |
| | 12 | 50 Ph 1, Fe*_ | 65 Ph 2*. |
| | 6 | 30 Ph 1, Fe__ | 20 Ph 2. |
| 1,2,3,4,5,6-hexachloro-1,3-bis-(trichloroacetoxy)cyclohexane. | 24 | 50 Ph 1, Fe__ | 95. |
| | 12 | 65 Ph 1, Fe__ | 99. |
| | 6 | 20 Ph 1, Fe__ | 50 Ph 2. |

*Ph—Phytotoxicity rating, 0 for no injury to 11 for killing the plants.
Fe—Formative effects to the plants.

EXAMPLE 28

Soil watering tests—Tomato and bean

To measure the growth regulating and herbicidal responses when chemicals are absorbed by roots and translocated, tomato plants, var. Bonny Best, 5 to 7 inches tall, and beans, var. Tendergreen, just as trifoliate leaves are beginning to unfold, are treated by drenching appropriate portions of a formulation containing 0.4 g. of the test chemical, 8 ml, acetone, 4 ml. stock emulsifier solution (0.5% Triton X–155 in water) and 187.6 ml. distilled water (concentration of the test chemical=2000 p.p.m.) on soil in clay pots containing the test plants. Tomatoes (1 plant per 4-inch pot) and bean plants (4 plants per 3½-inch pot) are treated with appropriate dosages of the 2000 p.p.m. formulation. Dosages of 56 ml. of the formulation in the 4-inch pot and 42 ml. in the 3½-inch pot are equivalent to 112 mg. and 84 mg. of chemical per pot, respectively, or 128 pounds per acre. Plants are held in a greenhouse for two weeks before records are taken. Phytotoxicity is rated on the scale from 0, indicating no plant injury, to 11, plant kill. Additionally, all other responses such as stunting, formative effects, defoliant activity, growth regulant properties, chlorosis and the like are recorded. Using this procedure, the following results are obtained:

| Compound | Concentration lbs/acre | Phytotoxicity Rating | |
|---|---|---|---|
| | | Tomato | Beans |
| Catechol bis(trichloroacetate). | 16 | 0 | 0 St 9, Fe.* |
| | 8 | 0 | 0 St 4, Fe, De. |
| | 4 | 0 | 100% De. |
| 1,2,3,4,5,6-hexachloro-1,2-bis(trichloroacetoxy)cyclohexane. | 64 | 0 St 1, Ch. | 0 St 9. |

*St—Stunting, from 1 slight to 9 severe.
Fe—Formative effects to the plants.
De—Defoliant.
Ch—Chlorosis.

EXAMPLE 29

*Pre-emergence tests in soil*

To evaluate the effect of compounds of this invention upon the germination and subsequent growth of seeds in soil, two mixtures of seeds are used. One contains three broadleaf species (turnip, flax and alfalfa) and the other contains three grass species (millet, ryegrass and timothy). Each mixture is planted diagonally in one-half of a 9 x 9 x 2-inch aluminum pan filled to within one-half inch of the top with composed greenhouse soil. After planting, the seed mixture is uniformly covered with about one-quarter inch soil and watered. After 24 hours, a quantity of a basic formulation containing 167 mg. of the test chemical, 20 ml. acetone, 2 drops Triton X–155, and 20 ml. of distilled water is sprayed, at 10 pounds per square inch air pressure, uniformly over the surface of the pan. A dosage of 40 ml. of the basic formulation is equivalent to 32 pounds active chemical per acre. When less concentrated dosages are desired, the basic formulation is diluted. Two weeks after treatment, estimates are made on the fresh weight of seedling stand in the treated pans as well as in an untreated control pan. The percent control obtained with the test chemical is calculated. Using this procedure, the following results are obtained:

| Compound | Concentration, lbs./acre | Percent Control | |
|---|---|---|---|
| | | Broadleaf weeds | Grassy weeds |
| 1,2,3,4,5,6-hexachlorocyclohexyl trichloroacetate | 64 | 25 | 100 |
| 1,2,3,4,5,6-heptachlorocyclohexyl trichloroacetate | 64 | 25 | 75 |
| 1,2,3,4,5,6-hexachlorocyclohexyl isocyanate | 64 | 60 | 50 |

EXAMPLE 30

*Pre-emergence tests in soil*

To evaluate the effect of compounds of this invention upon the germination and subsequent growth of seeds in soil, two mixtures of seeds are used. One contains three broadleaf species (buckwheat, aster and turnip) and the other contains three grass species (millet, perennial ryegrass and sorghum). Each mixture is planted diagonally in one-half of a 9 x 9 x 2-inch aluminum pan filled to within one-half inch of the top with composted greenhouse soil. After planting, the seed mixture is uniformly covered with about one-quarter inch soil and watered. After 24 hours, a quantity of a basic formulation containing 125 mg. of the test chemical, 20 ml. acetone, 2 drops Triton X–155, and 20 ml. of distilled water is sprayed, at 10 pounds per square inch air pressure, uniformly over the surface of the pan. A dosage of 40 ml. of the basic formulation is equivalent to 24 pounds active chemical per acre. When less concentrated dosages are desired, the basic formulation is diluted. Two weeks after treatment, estimates are made on the fresh weight of seedling stand in the treated pans as well as in an untreated control pan. The percent control obtained with the test chemical is calculated. Using this procedure, the following results are obtained:

| Compound | Concentration, lbs./acre | Percent Control | |
|---|---|---|---|
| | | Broadleaf weeds | Grassy weeds |
| Catechol bis(trichloroacetate). | 12 | 0 Ph 2 | 98 Fe, St 9.* |
| | 6 | 0 Ph 1 | 95 Fe, St 8. |
| | 3 | 0 | 90 Fe, St 7. |
| | 1.5 | 0 | 20 Fe, St 4. |
| 1,2,3,4,5,6-hexachloro-1,2-bis(trichloroacetoxy)cyclohexane. | 12 | 0 St 2, Ph 1 | 99 Fe, St 9. |
| | 6 | 0 St 1 | 95 Fe, St 9. |
| | 3 | 0 | 85 Fe, St 8. |
| | 1.5 | 0 | 20 Fe. |
| 1,2,3,4,5,6-hexachloro-1,3-bis(trichloroacetoxy)cyclohexane. | 12 | 0 St 1 | 98 Fe, St 9. |
| | 6 | 0 St 1 | 95 Fe, St 8. |
| | 3 | 0 | 65 Fe, St 3. |
| | 1.5 | 0 | 0 Fe. |

*Ph—Phytotoxicity rating, from 0 no injury to 11 kill.
Fe—Formative effects.
St—Stunting, from 1 slight to 9 severe.

EXAMPLE 31

*Protection of cabbage from* Sclerotium rolfsii *by soil treatment*

Air dry sterile soil is infested with the organism *Sclerotium rolfsii* grown on a mixture of corn meal and sand. The desired inoculum level is achieved by adding an appropriate amount of the corn meal-sand culture to the soil. The soil is placed into 3¼" x 3¼" x 2½" plastic boxes and 25 ml. of the test formulation is poured onto the soil giving a rate of 64 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. The test formulation is thoroughly incorporated into the soil. A similar box of soil is prepared which has been treated with the test formulation, but has not been inoculated with the organism. The non-inoculated treated control is used to determine the phytotoxicity of each test compound. Twenty-five cabbage seeds (Golden Acres) are planted in the treated soil in each box. Each box receives 50 ml. of water and is placed in a humidity chamber maintained at 70° C. for 2 days. The boxes are then transferred to the greenhouse. Effectiveness of the test chemical is determined by the percentage of plants growing 14 days after treatment and planting.

| Compound Tested | Percent Stand | |
|---|---|---|
| | Non-inoculated | Inoculated |
| 1,2,3,4,5,6-hexachloro-1,3-bis(trichloroacetoxy)cyclohexane | 100 | 60 |

What is claimed is:
1. An addition-halogenated compound represented by the structure:

$$(X)_n\text{—(cycloalkyl group)—}N{=}C{=}R^8$$

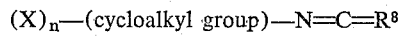

wherein X is halogen, $n$ is a number greater than 4 inclusive, $R^8$ is selected from the group consisting of oxygen and chlorine atoms; any free bonds being satisfied by hydrogen.
2. 1,2,3,4,5,6-hexachlorocyclohexyl isocyanate.
3. N-(1,2,3,4,5,6-hexachlorocyclohexyl)imido carbonyl chloride.

(References on following page)

References Cited by the Examiner

UNITED STATES PATENTS

| | | | |
|---|---|---|---|
| 2,494,283 | 1/1950 | Cassaday et al. | 260—461 |
| 2,536,647 | 1/1951 | Kosolapoff | 260—461 |
| 2,571,901 | 10/1951 | Lawlor | 260—694 X |
| 2,627,488 | 2/1953 | Zakheim | 167—30 |
| 2,714,572 | 8/1955 | Hansen | 167—30 |
| 2,767,206 | 10/1956 | Whetstone et al. | 260—461 |
| 2,809,982 | 10/1957 | Lowes et al. | 260—461 |
| 2,945,875 | 7/1960 | Tazuma | 260—453 |
| 3,041,366 | 6/1962 | Senkbeil | 260—461 |
| 3,080,417 | 3/1963 | Rosen | 260—487 |
| 3,096,239 | 7/1963 | Hoch et al. | 167—30 |

FOREIGN PATENTS 5,595    7/1957    Japan.

OTHER REFERENCES

Hackh Chemical Dictionary, 3rd edition, 1953, page 17.

Nakajima et al.: "Botyu-Kagaku," vol. 21, pp. 14–20 (1956).

Sen et al.: "J. Indian Chem. Soc., vol. 26, pp. 243–244 (1949).

CHARLES B. PARKER, *Primary Examiner.*

IRVING MARCUS, JOSEPH P. BRUST, *Examiners.*